July 20, 1948.
U. C. S. DILKS
PENDULUM CONTROLLED ELECTRIC
DIVE ANGLE INDICATOR
Filed March 4, 1947
2,445,517
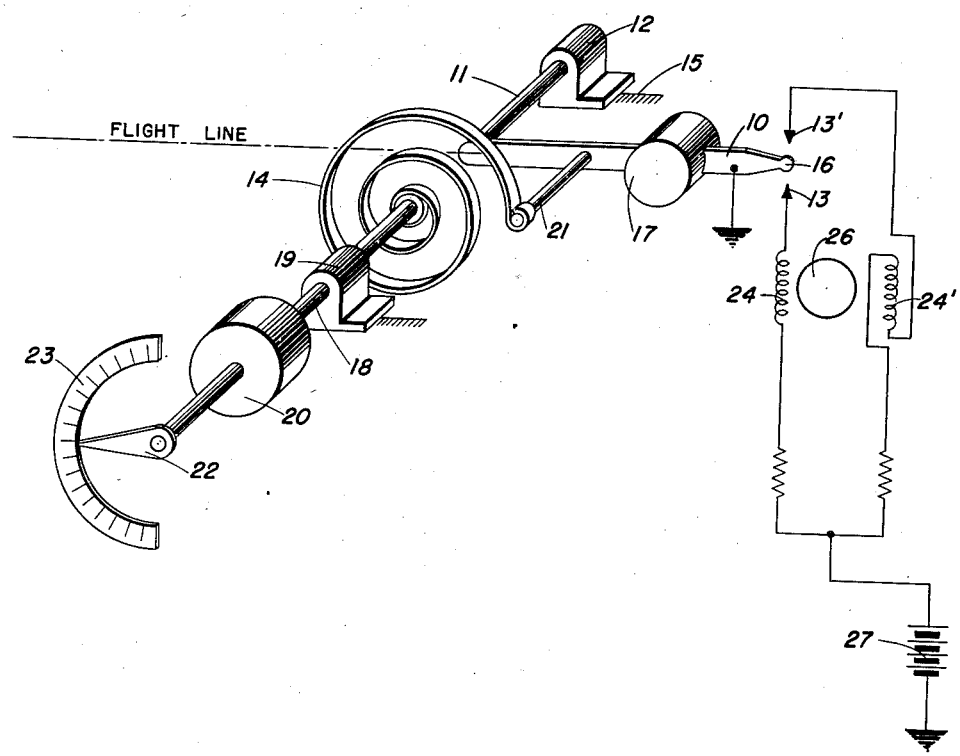
INVENTORS
USELMA C. S. DILKS
BY *G. D. O'Brien*
ATTORNEY Patented July 20, 1948

2,445,517

UNITED STATES PATENT OFFICE 2,445,517

PENDULUM CONTROLLED ELECTRIC DIVE ANGLE INDICATOR

Uselma C. S. Dilks, Narberth, Pa., assignor to the United States of America as represented by the Secretary of the Navy Application March 4, 1947, Serial No. 732,267

4 Claims. (Cl. 33—215)

This invention relates to devices for measuring the angle between a movable plane and the horizontal and it pertains particularly to instruments for measuring and indicating the glide angles of aircraft in flight.

It is well known that in certain aircraft operations a necessary datum for their success is the angle at which the aircraft is climbing or gliding. For example, when aircraft torpedoes are launched from relatively low altitudes, or when a multiplane coordinated attack is made on a surface target, the ability to maintain a certain predetermined glide angle is of considerable importance to the successful conclusion of the operation.

An object of the invention, therefore, is to provide an instrument capable of indicating the angle at which an aircraft is climbing or gliding.

Another object of the invention is to provide such a device of simple construction which may be easily adjusted and maintained.

For a clear understanding of the invention and other and ancillary objects and advantages thereof, reference may be had to the accompanying specification and drawings in which the figure is a schematic view of a glide angle indicator made in accordance with the invention, and shows an electrical circuit used therewith.

In the drawing an arm 10 is shown secured to a shaft 11 rotatably mounted in a journal 12 fixed to the deck 15 or other stationary portion of the aircraft. The arm may thus rotate in a vertical plane but such rotational movement is restricted within the limits of fixed electrical contacts 13 and 13' and by a spiral spring 14. When the entire mechanical system is in equilibrium the contact 16 on arm 10 is balanced between contacts 13 and 13'. A weight 17, carried by the arm, increases the moment of inertia of the latter.

The spring is carried by a shaft 18 supported in a bearing 19, the shaft being an extension of an armature shaft (undesignated) of a motor 20. The other end of the spring 14 is attached to a post 21 carried by the arm 10. An indicator or pointer 22, mounted also on the armature shaft of the motor rotates with the latter and, by passing over a suitable scale 23, indicates the angle through which the motor has rotated.

Electrical energy is supplied to the field windings 24 and 24' and to the armature 26 of the motor by a 24-volt D. C. source, as battery 27. The field windings 24 and 24' are oppositely wound, as shown in the drawing and cause the armature 26 to rotate in opposite directions depending upon which field winding is energized.

In operation the glide angle indicator is installed parallel to the longitudinal axis of the aircraft with spring 14 and arm 10 and contacts 13 and 13' in parallel vertical planes. When properly adjusted, the arm 10 is balanced horizontally between contacts 13 and 13', the balance being effected by an equilibrium in the torsional relationship between the arm 10 and the shaft 18. The spring is wound to the greatest extent when the arm 10 is in the initial (horizontal) position, since the torque exerted by the weight 17 is greatest in this position.

When the aircraft is put into a glide, the entire indicating mechanism is rotated about a transverse axis placing the arm at an angle to the horizontal. The torque of weight 17, being a function of the cosine of the glide angle, is thus reduced, upsetting the equilibrium. The spring now has more than enough energy to hold the arm 10 in the gliding position, and expends it on the arm by rotating it upward until contact 16 engages contact 13' in the electrical circuit. The field winding 24' is thus energized and armature 26 moves in the direction to loosen the spring, the indicator 22 in turn moving over scale 23 to designate the amount of such rotation. Energization of field winding 24' continues until contact is broken between contacts 16 and 13'. When the aircraft again assumes horizontal flight, the system is rotated to bring the arm 10 again into the horizontal position. The torque is thus increased, and contact 16 is brought into engagement with contact 13, energizing field winding 24 which causes armature 26 to rotate in the opposite direction. This action winds spring 14 until its energy is capable of lifting contact 16 away from contact 13, thereby stopping the winding action of motor 20.

The glide angle indicator operates in exactly the same manner when the aircraft is in a climbing attitude as it does when in a glide, as above described, since both maneuvers upset the torsional equilibrium in exactly the same way and to the same extent. Therefore the indicator needle 22 will always move in the same direction when indicating climbs or glides, the distinction being made either visually or by other instruments, for example the artificial horizon commonly used in aircraft.

To minimize the effects of accelerations normal to the flight line, such as may result from turbulent air, we prefer to operate the motor 20 at low speed; thus only inappreciable movement of the indicator 22 will result from momentary engagement of the arm contact 16 and either of contacts 13 and 13'.

I claim:

1. A device for measuring the dihedral angle between a fixed plane and a movable plane comprising a pendulous arm movable relative to the movable plane in response to variations in the dihedral angle between the planes, an electrical contact adapted to cooperate with the said pendulous arm when the angle varies a predetermined amount, resilient means for normally maintaining the said arm out of engagement with the said contact, electrical means operable when the said arm engages the said contact for changing the resilience of said resilient means, and indicating means operable by said electrical means.

2. A device for measuring the dihedral angle between a fixed plane and a movable plane comprising a pendulous arm movable relative to the movable plane in response to variations in the dihedral angle between the planes, a pair of electrical contacts adapted to cooperate with the said pendulous arm when the angle varies a predetermined amount, resilient means for normally maintaining the said arm out of engagement with the said contacts, electrical means operable when the said arm engages the said contacts for changing the resilience of said resilient means, and indicating means operable by said electrical means.

3. A device for measuring the dihedral angle between a fixed plane and a movable plane comprising a pendulous arm movable relative to the movable plane in response to variations in the dihedral angle between the planes, a pair of electrical contacts adapted to cooperate with said arm when the angle varies a predetermined amount, resilient means including a spring for normally maintaining said arm out of engagement with said contacts, a motor operable when said arm engages one of said contacts for changing the resilience of said resilient means, and indicating means operable by said motor.

4. A device for measuring the angle of attack of an aircraft comprising a pendulous contact arm mounted on said aircraft, a pair of electrical contacts fixed to said aircraft and positioned proximately above and below said contact arm, a motor having oppositely wound field coils and capable of rotation in either direction, one of said field coils electrically connected to each of said contacts, a spring operationally disposed between the shaft of said motor and said contact arm, and indicating means for measuring the extent of rotation of said motor shaft, said motor being adapted to rotate when said arm engages one of said contacts whereby the resilience of said spring is changed and said arm is urged out of engagement with said contact.

USELMA C. S. DILKS.